United States Patent
Singleton et al.

(10) Patent No.: US 9,633,679 B2
(45) Date of Patent: Apr. 25, 2017

(54) SENSOR STACK STRUCTURE WITH RKKY COUPLING LAYER BETWEEN FREE LAYER AND CAPPING LAYER

(71) Applicant: Seagate Technology LLC, Cupertino, CA (US)

(72) Inventors: Eric W. Singleton, Maple Plain, MN (US); Liwen Tan, Eden Prairie, MN (US); Jae-Young Yi, Prior Lake, MN (US); Konstantin Nikolaev, Bloomington, MN (US); Zhiguo Ge, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/270,593

(22) Filed: May 6, 2014

(65) Prior Publication Data
US 2015/0325260 A1 Nov. 12, 2015

(51) Int. Cl.
*G11B 5/39* (2006.01)
*G11B 5/11* (2006.01)
*G11B 5/31* (2006.01)

(52) U.S. Cl.
CPC .......... *G11B 5/3912* (2013.01); *G11B 5/3153* (2013.01); *G11B 5/3909* (2013.01); *G11B 5/3932* (2013.01); *G11B 2005/3996* (2013.01)

(58) Field of Classification Search
CPC ..................... G11B 5/3912; G11B 5/3932
USPC .............................................. 360/319
See application file for complete search history.

(56) References Cited

U.S. PATENT DOCUMENTS

| | | | |
|---|---|---|---|
| 7,522,391 B2 | 4/2009 | Freitag et al. | |
| 8,369,048 B2 | 2/2013 | Miyauchi et al. | |
| 8,437,106 B2 | 5/2013 | Yanagisawa et al. | |
| 8,462,467 B2 | 6/2013 | Yanagisawa et al. | |
| 8,630,069 B1 | 1/2014 | Okawa et al. | |
| 2006/0023373 A1 | 2/2006 | Gill | |
| 2007/0030603 A1* | 2/2007 | Sato et al. | G11B 5/39 360/324 |
| 2009/0174968 A1* | 7/2009 | Singleton et al. | 360/319 |
| 2010/0079917 A1* | 4/2010 | Miyauchi et al. | 360/319 |
| 2011/0091744 A1* | 4/2011 | Kawamori et al. | 156/221 |
| 2011/0232079 A1* | 9/2011 | Miyauchi et al. | 29/603.07 |

(Continued)

FOREIGN PATENT DOCUMENTS

| | | |
|---|---|---|
| JP | 2008-192269 A | 8/2008 |
| JP | 2012-133864 A | 7/2012 |

(Continued)

*Primary Examiner* — Craig A. Renner
(74) *Attorney, Agent, or Firm* — Holzer Patel Drennan

(57) ABSTRACT

A reader stack, such as for a magnetic storage device, the stack having a top synthetic antiferromagnetic (SAF) layer, a magnetic capping layer adjacent to the top SAF layer, an RKKY coupling layer adjacent to the magnetic capping layer opposite the top SAF layer, and a free layer adjacent to the RKKY coupling layer opposite the magnetic capping layer. Also included is a method for biasing a free layer in a reader stack by providing an exchange coupling between the free layer and a top synthetic antiferromagnetic (SAF) layer using a layer having RKKY coupling property positioned between the free layer and the top SAF layer and a magnetic capping layer between the SAF layer and the layer having RKKY coupling property.

17 Claims, 10 Drawing Sheets

(56) References Cited

U.S. PATENT DOCUMENTS

| | | | |
|---|---|---|---|
| 2011/0279923 A1* | 11/2011 | Miyauchi et al. | 360/319 |
| 2011/0317313 A1* | 12/2011 | Miyauchi et al. | 360/319 |
| 2012/0087045 A1* | 4/2012 | Yanagisawa et al. | 360/319 |
| 2012/0240390 A1 | 9/2012 | Degawa et al. | |
| 2012/0250189 A1* | 10/2012 | Degawa et al. | 360/319 |
| 2012/0327537 A1 | 12/2012 | Singleton et al. | |
| 2014/0268428 A1* | 9/2014 | Dimitrov et al. | 360/313 |
| 2015/0116867 A1* | 4/2015 | Childress et al. | G11B 5/3912 360/319 |
| 2015/0221326 A1* | 8/2015 | Jung et al. | G11B 5/332 360/328 |

FOREIGN PATENT DOCUMENTS

| | | |
|---|---|---|
| JP | 2015-082338 A | 4/2015 |
| JP | 2015-141732 A | 8/2015 |

* cited by examiner

SENSOR STACK STRUCTURE WITH RKKY COUPLING LAYER BETWEEN FREE LAYER AND CAPPING LAYER

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This disclosure is directed to sensor stacks having various layers.

One particular implementation of this disclosure is a method for biasing a free layer in a reader stack by providing an exchange coupling between the free layer and a top synthetic antiferromagnetic (SAF) layer using a layer having RKKY coupling property positioned between the free layer and the top SAF layer and a magnetic capping layer between the SAF layer and the layer having RKKY coupling property.

Another particular implementation of this disclosure is an apparatus including a reader stack, the stack having a top synthetic antiferromagnetic (SAF) layer, a magnetic capping layer adjacent to the top SAF layer, an RKKY coupling layer adjacent to the magnetic capping layer opposite the top SAF layer, and a free layer adjacent to the RKKY coupling layer opposite the magnetic capping layer.

These and various other features and advantages will be apparent from a reading of the following detailed description.

DETAILED DESCRIPTION

Figure 1:
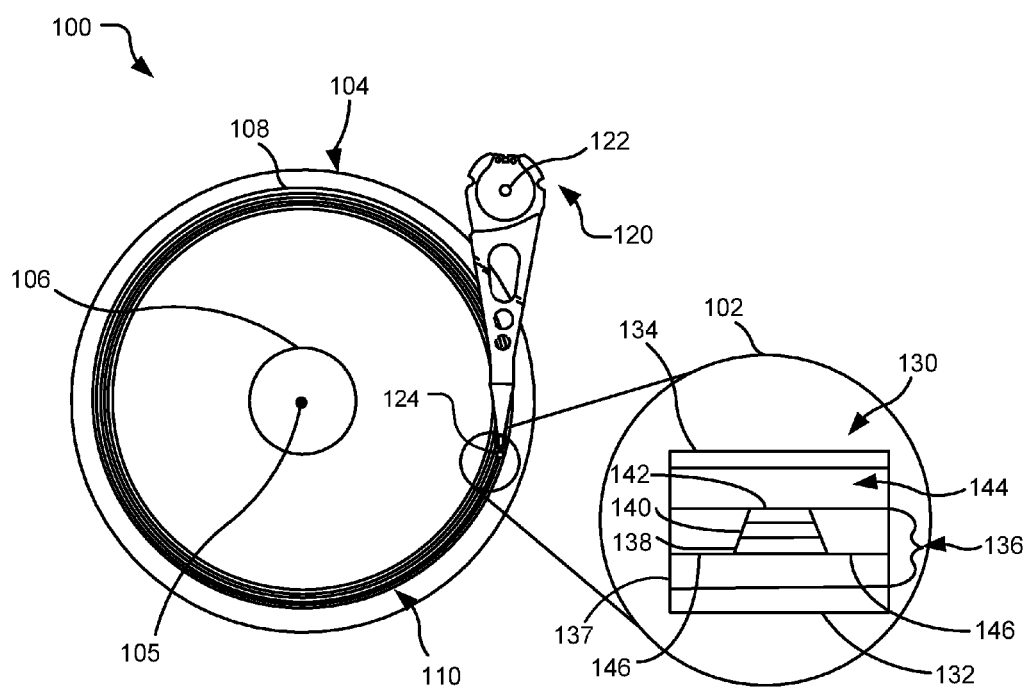
FIG. 1 illustrates a data storage device having an example magnetoresistive (MR) sensor having a sensor stack according to this disclosure.

There is an increasing demand for high data densities and sensitive sensors to read data from a magnetic media. These read sensors can be magnetoresistive (MR) sensors that include various layers that have a magnetization vector or orientation. Magnetic flux from the surface of the magnetic media affects the magnetization direction, which in turn affects the electrical resistivity of the MR sensor, allowing the sensor to read data from the magnetic media.

As a general overview, a MR read sensor has a sensor stack that includes magnetic layer, typically a soft magnetic material, that has a magnetic orientation that rotates freely in response to an external field; this magnetic layer is called a "free layer" (FL). It is the magnetization direction of the free layer (FL) that affects the electrical resistivity of the MR sensor. A synthetic antiferromagnetic (SAF) layer, which includes a magnetic pinned layer (PL) having a pinned magnetization orientation and a reference layer (RL) having a magnetization orientation opposite to the PL and separated from the PL by a spacer layer, is adjacent the FL and affects the magnetic orientation of the free layer. Also present in the read sensor are various other layers, including another SAF layer above the sensor stack, which is referred to as SAF top shield.

The read stack may include side shields to provide a magnetic biasing field to the FL in the sensor stack. In some implementations, a non-magnetic top bulk shield and a non-magnetic bottom bulk shield are also present in the read sensor.

The side shields may be, for example, permanent magnets (PM) or soft magnetic side shields (e.g., NiFe) to provide a magnetic biasing field on the FL in the sensor stack. The soft side shields are directly magnetic coupled with the top SAF layer. As the requirements on areal density capability and resolution increase, the shield-to-shield spacing (SSS), which is the distance between the bottom shield and SAF top shield, squeezes down resulting in a decrease in the thickness of the side shields which in turn decreases FL stability. Especially in a wide antiferromagnetic (AFM) layer design, side shield thickness is significantly reduced. To compensate for the reduction of FL bias strength due to the thinner side shield thickness, higher moment side shields, and/or high Hk free layer materials may be used to increase the FL stability. In the present disclosure, an alternate structure is provided.

In this disclosure, an MR sensor is described that includes a magnetic capping layer in the sensor stack between the FL and the SAF layer in the SAF top shield to achieve coupling between the FL and SAF top shield, in order to further stabilize the FL. Presence of the magnetic capping also decreases the SSS, thus allowing increased areal density.

By introducing a magnetic cap layer into the sensor stack, the thickness of the non-magnetic cap layers is reduced, resulting in the reduction of the SSS. The MR sensors disclosed herein have the free layer exchange coupled with the SAF layer in the SAF top shield via the magnetic capping layer being magnetically coupled with the SAF.

It is noted that the technology disclosed herein may be used in conjunction with a variety of different types of MR sensors (e.g., anisotropic magnetoresistive (AMR) sensors, TMR sensors, GMR sensors, etc.). Accordingly, the implementations discussed may also be applicable to new MR sensor designs that are based on new physical phenomena such as lateral spin valve (LSV), spin-hall effect (SHE), spin torque oscillation (STO), etc.

FIG. 1 illustrates a data storage device 100 having an example MR sensor, shown in more detail in an exploded view 102. Although other implementations are contemplated, in the illustrated implementation, data storage device 100 includes a storage medium 104 (e.g., a magnetic data storage disc) on which data bits can be recorded using a magnetic write pole and from which data bits can be read using a magnetoresistive (MR) element. Storage medium 104 rotates about a spindle center or a disc axis of rotation 105 during rotation, and includes an inner diameter 106 and an outer diameter 108 between which are a number of concentric data tracks 110. It should be understood that the MR technology described herein may be used with a variety of storage formats, including continuous magnetic media, discrete track (DT) media, shingled media, etc.

Information may be written to and read from data bit locations in data tracks 110 on storage medium 104. An actuator assembly 120, having an actuator axis of rotation 122, supports a transducer head assembly 124 at a distal end thereof. Transducer head assembly 124 'flies' in close proximity above the surface of storage medium 104 during disc rotation. Actuator assembly 120 rotates during a seek operation about actuator axis of rotation 122. The seek operation positions transducer head assembly 124 over a target data track for read and write operations.

The exploded view 102 schematically illustrates an air-bearing surface (ABS) view of an MR sensor 130. MR sensor 130 includes a bottom bulk shield 132, a top bulk shield 134, and a sensor stack 136. Adjacent bottom bulk shield 132 is illustrated an AFM layer 137, however in some implementations a seed layer (not shown) may be present. Sensor stack 136 also includes a SAF layer 138, a free layer (FL) 140, and a magnetic capping layer 142. Sensor stack 136 may also include additional layers such as a metallic coupling layer (e.g., ruthenium) between magnetic capping layer 142 and FL 140, and other various layers, the detailed structure of sensor stack 136 and MR sensor 130 not being shown in FIG. 1.

Positioned between top bulk shield 134 and sensor stack 136 is another SAF layer 144, which includes a pinned layer, a reference layer and a spacer layer therebetween. The pinned layer "pins" the magnetic orientation of the reference layer through the antiferromagnetic exchange coupling. The reference layer in SAF layer 144 and magnetic capping layer 142 are directly magnetically coupled, as there is no spacer layer between them. SAF layer 144 is exchange coupled to free layer 140 via magnetic capping layer 142.

Sensor stack 136 also includes side shields 146 located on the two sides of sensor stack 136 in the cross-track direction; side shields 146 may be used to bias the magnetic orientation of free layer 140 of sensor stack 136.

Figure 2:
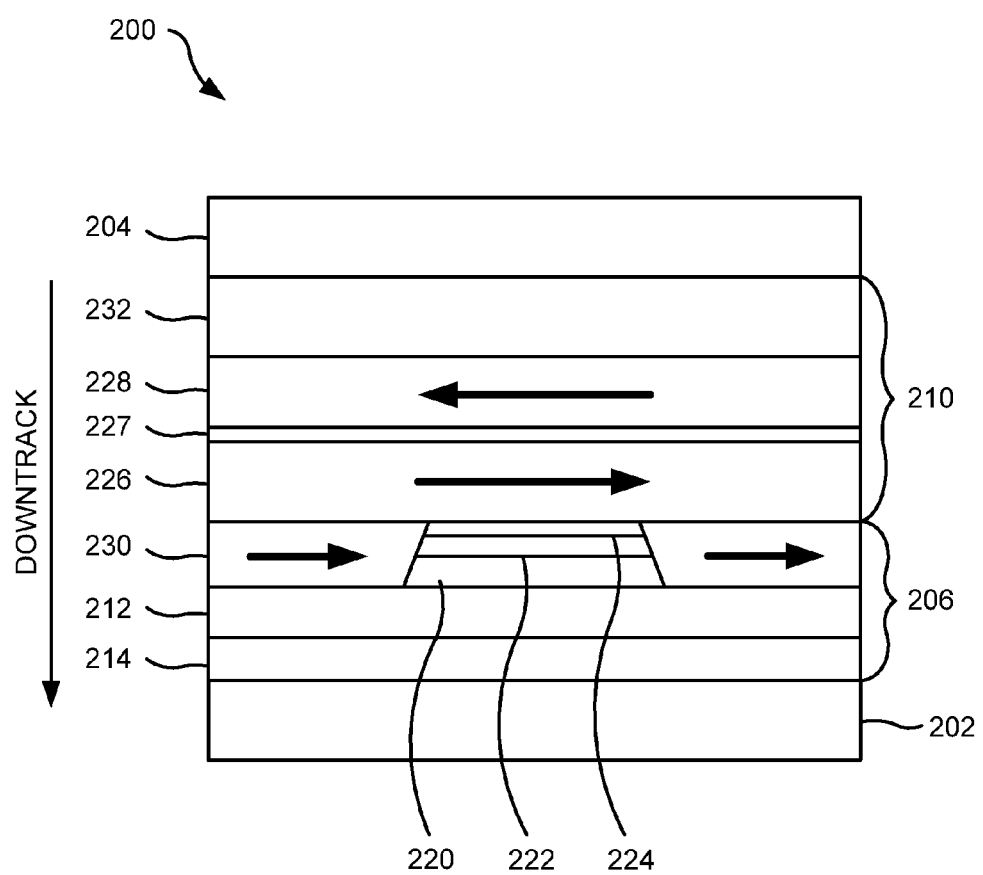
FIG. 2 illustrates a schematic view of an air-bearing surface of an implementation of an MR sensor.

FIG. 2 illustrates an air bearing surface (ABS) view of an implementation of an MR sensor 200. MR sensor 200 includes a bottom bulk shield 202 and a top bulk shield 204 on two opposite sides (along downtrack direction) of a sensor stack 206. Proximate bottom bulk shield 202, sensor stack 206 includes an AFM layer 212 and a seed layer 214.

Sensor stack 206, in this implementation, includes a SAF layer 220 adjacent AFM layer 212 and a free layer 222 which has a switchable magnetic orientation, the orientation of free layer 222 not being shown in FIG. 2. SAF 220 is composed of a pinned layer, spacer layer and reference layer, the particulars of which are not detailed in FIG. 2. Not shown in FIG. 2, a barrier layer may be present between free layer 222 and SAF layer 220. Adjacent free layer 222, opposite SAF layer 220, is an electrically conductive, non-magnetic reader stack cap 224. In some embodiments, reader stack cap 224 is a Ru/Ta/Ru multilayer, whereas in other embodiments reader stack cap 224 is a thick (e.g., a few nm) layer of Ru or other non-magnetic metal.

Adjacent sensor stack 206 on the side opposite AFM layer 212 and bottom bulk shield 202 are a plurality of layers referred to herein as a synthetic antiferromagnetic-shield, or SAF top shield, labeled as 210. Also part of SAF top shield 210 is a reference layer 226 and a pinned layer 228, with a spacer layer 227 therebetween, which together form a SAF; this may be referred to as a 'top SAF', for as illustrated in FIG. 2, these layers, or SAF, are positioned above or on top of free layer 222, or alternately, is proximate top bulk shield 204. Various other layers may be present in SAF top shield 210.

The magnetic orientation of pinned layer 228 in SAF top shield 210 is pinned, to a certain extent, by an AFM layer 232 of SAF top shield 210; again, this may be referred to as a 'top AFM layer', for as illustrated in FIG. 2, this layer 232 is positioned above or on top of free layer 222, or alternately, is proximate top bulk shield 204. No coupling occurs between free layer 222 and SAF top shield 210 due to the presence of cap 224, which is composed of a non-magnetic material (typically a few nm thick). Not illustrated in FIG. 2, another cap layer may be present between top bulk shield 204 and AFM layer 232 to decouple top bulk shield 204 from AFM layer 232.

Located on the two sides of sensor stack 206, in the cross-track or lateral direction, are side shields 230, which can be used to bias the magnetic orientation of free layer 222 of sensor stack 206. In the illustrated implementation, side shields 230 encompass all layers of SAF layer 220 (e.g., the pinned layer, spacer layer and reference layer), free layer 222 and spacer layer 224. In other implementations, for example, side shields 230 may not encompass the pinned layer of SAF 220, but rather, the pinned layer of SAF 220 may extend the entire cross-track width of sensor 200.

The various materials for the layers of MR sensor 200 can be, for example:

Magnetic or ferromagnetic materials have a magnetic orientation and may be soft magnetic or hard (permanent) magnetic. Typically soft magnetic materials are used for free layer 222 and other layers that should have a switchable magnetic orientation. Examples of antiferromagnetic (AFM) materials include IrMn, PtMn, FeMn, and other magnetic materials that have no net magnetic moment.

Side shields may be non-magnetic, soft magnetic, or hard magnetic. For the implementation of FIG. 2, side shields 230 are soft magnetic side shields and magnetically coupled with SAF top shield 210. In other implementations, side shields 230 may be hard magnetic side shields.

Examples of suitable materials for spacer layers, such as layer 227, include ruthenium (Ru). In some spacer layers, such as layer 224, multiple layers of materials may be used; for example, layer 224 could ruthenium and tantalum (Ta), arranged as Ru/Ta/Ru. Examples of suitable materials for tunneling barrier layers, such as might be present between SAF 220 and FL 222, including MgO, $Al_2O_3$, and $Ti_2O_3$.

Materials for a seed layer, such as layer 214, may be magnetic or non-magnetic. Examples of non-magnetic seed layers are Ta and Ru.

Figure 3:
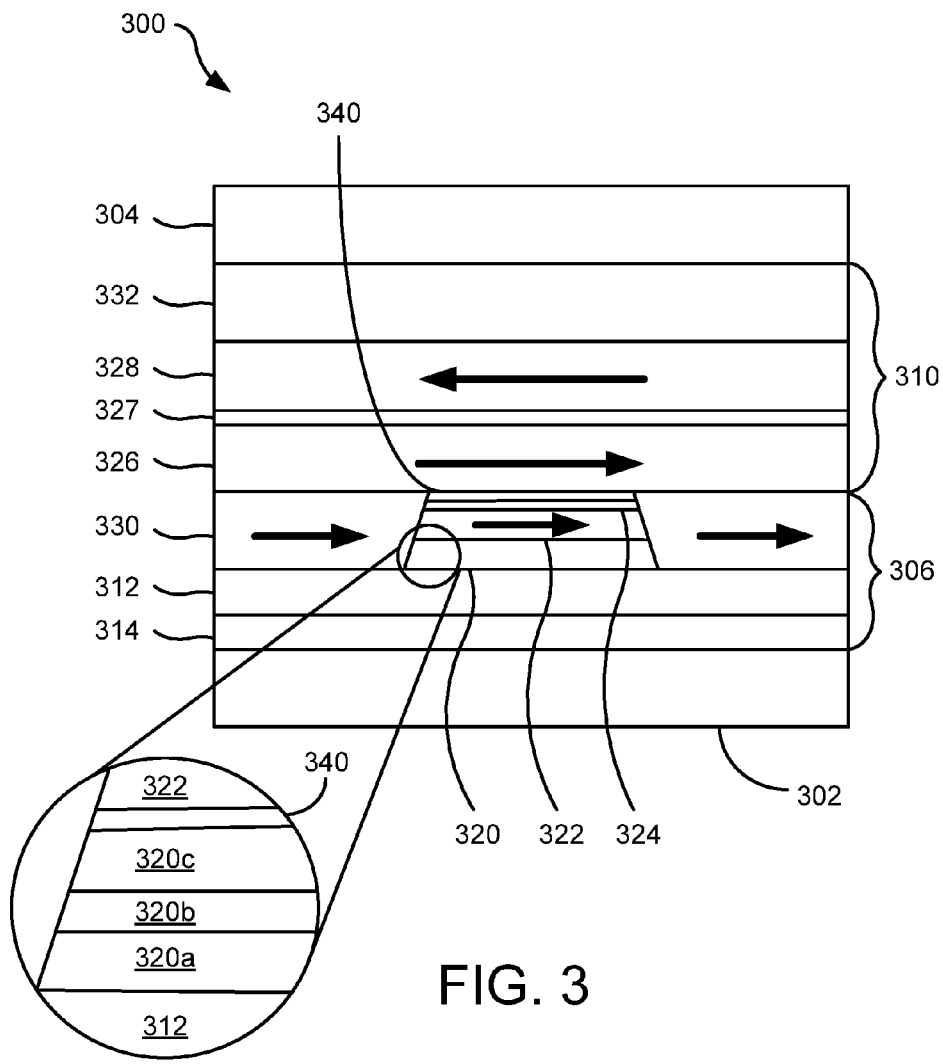
FIG. 3 illustrates a schematic view of an air-bearing surface of an alternative implementation of an MR sensor.

Turning to FIG. 3, another implementation of an MR sensor is illustrated. MR sensor 300 and the various elements thereof in FIG. 3 are generally similar to MR sensor 200 and the various elements thereof described above with respect to FIG. 2, unless otherwise noted. Similar components are designated by similar reference numbers with values increased by one hundred in FIG. 3, as compared to FIG. 2. This component identification convention is followed throughout this disclosure.

MR sensor 300 includes a bottom bulk shield 302 and a top bulk shield 304 on two opposite sides (along downtrack direction) of a sensor stack 306. Proximate bottom bulk shield 302, sensor stack 306 includes an AFM layer 312 and a seed layer 314. Adjacent sensor stack 306 on the side opposite bottom bulk shield 302 is a SAF top shield 310 that includes a reference layer (RL) 326 and a pinned layer (PL) 328, with a spacer layer 327 therebetween, and an AFM layer 332; not shown in FIG. 3 is a spacer layer between top bulk shield 304 and AFM layer 332. Located on the two sides of sensor stack 306, in the cross-track or lateral direction, are side shields 330, in this implementation, soft magnetic side shields.

Sensor stack 306, in this implementation, includes a SAF layer 320 proximate AFM layer 312 and a free layer (FL) 322 which has a switchable magnetic orientation. A tunneling barrier layer 340 may be present between SAF layer 320 and FL 322. SAF layer 320 is composed of a pinned layer, a spacer layer and a reference layer, detailed in the inset of FIG. 3. In the illustrated implementation, layer 320a is a pinned layer, layer 320b is a spacer layer, and layer 320c is a reference layer. Unlike the sensor 200 of FIG. 2, sensor 300 of FIG. 3 includes a RKKY coupling layer 324 adjacent to free layer 322 on the side opposite SAF layer 320.

RKKY coupling is a coupling mechanism of nuclear magnetic moments or localized inner "d" or "f" shell electron spins in a metal by means of an interaction through the conduction electrons. RKKY coupling occurs when an indirect exchange couples moments over relatively large distances. It is the dominant exchange interaction in metals where there is little or no direct overlap between neighboring magnetic electrons. The exchange coupling acts through an intermediary, i.e., an RKKY material, which are the conduction electrons (itinerant electrons). Examples of materials that have RKKY coupling, and would be suitable for layer 324, include ruthenium (Ru) and other materials that can provide ferromagnetic or antiferromagnetic RKKY coupling as a function of the thickness of the material layer. RKKY coupling layer 324 provides either ferromagnetic or antiferromagnetic coupling between FL 322 and SAF top shield 310.

Sensor stack 306 further includes a magnetic capping layer 340 between RKKY coupling layer 324 and SAF top shield 310. Magnetic side shields 330 encompass SAF layer 320, FL 322, RKKY coupling layer 324 and magnetic capping layer 340 and provide stabilization to FL 322.

Magnetic capping layer 340 provides additional biasing to FL 322 from SAF top shield 310 by providing exchange coupling between FL 322 and reference layer 326 through RKKY coupling layer 324. By adjusting the thickness of RKKY coupling layer 324, FL 322 can be anti-ferromagnetically or ferromagnetically coupled with SAF top shield 310. In the implementation of FIG. 3, FL 322 is ferromagnetically coupled with SAF top shield 310, particularly, with reference layer 326.

In addition to being at least softly magnetic, the material of magnetic capping layer 340 includes a ferromagnetic material (e.g., Co, Fe, CoFe, NiFe, etc.) and a refractory material (e.g., tantalum (Ta), niobium (Nb), hafnium (Hf), zirconium (Zr) or other Group IVB or Group VB transition metals). In some implementations, the material of magnetic capping layer 340 can be identified as CoFeX, where X is a refractory material, at approximately 1 to 30 atomic percent. In some implementations, the material has no significant TMR degradation, relatively low magnetostriction, and/or is amorphous. The material should be able to sustain high temperature annealing and remain magnetically soft.

Magnetic capping layer 340 is entirely positioned, side-to-side, between side shields 330, although in other implementations, magnetic capping layer 340 may extend further up-track, into RL 326.

Although an additional layer (i.e., magnetic capping layer 340) is present in sensor stack 306, magnetic capping layer 340 allows the reduction in thickness of any non-magnetic capping layers, such as reader stack cap 224 in sensor 200 of FIG. 2, and thus reduces the downtrack width of sensor stack 306. As a result, the effective shield-to-shield spacing (SSS) between SAF top shield 310 and bottom bulk shield 302 is reduced, which effectively provides improved linear density and resolution to MR sensor 300 compared to MR sensor 200 having no magnetic capping layer.

Figure 4:
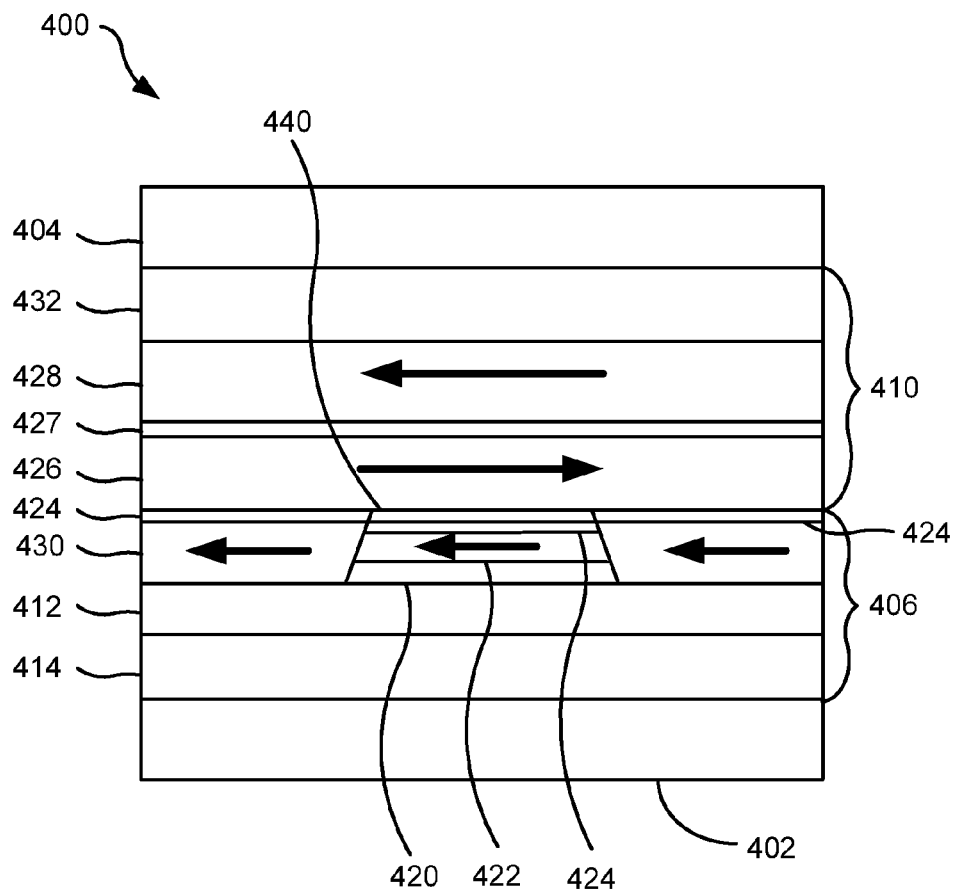
FIG. 4 illustrates a schematic view of an air-bearing surface of yet another alternative implementation of an MR sensor.

FIG. 4 illustrates another implementation of an MR sensor. MR sensor 400 and the various elements thereof are generally similar to MR sensor 300 and the various elements described above with respect to FIG. 3. Similar components are designated by similar reference numbers with values increased by one hundred in FIG. 4, as compared to FIG. 3.

MR sensor 400 includes a bottom bulk shield 402 and a top bulk shield 404 on opposite downtrack sides of a sensor stack 406. Proximate bottom bulk shield 402, sensor stack 406 includes an AFM layer 412 and a seed layer 414. Adjacent sensor stack 406 is a SAF top shield 410 that includes a RL 426 and a PL 428, with a spacer layer 427 therebetween, and an AFM layer 432; not shown in FIG. 4 is a spacer layer between top bulk shield 404 and AFM layer 432. Located on the two sides of sensor stack 406, in the cross-track or lateral direction, are side shields 430, in this implementation, soft magnetic side shields.

Sensor stack 406 includes a SAF layer 420 (the various layers of which are not shown) and FL 422 which has a switchable magnetic orientation and magnetic side shields 430. In this implementation, both FL 422 and side shield 430 are anti-ferromagnetically coupled with SAF top shield 410 through a RKKY coupling layer 424 and a magnetic capping layer 440. Magnetic capping layer 440 is directly ferromagnetically coupled with RL 426, which enables RKKY coupling between RL 426 and FL 422.

Figure 5:
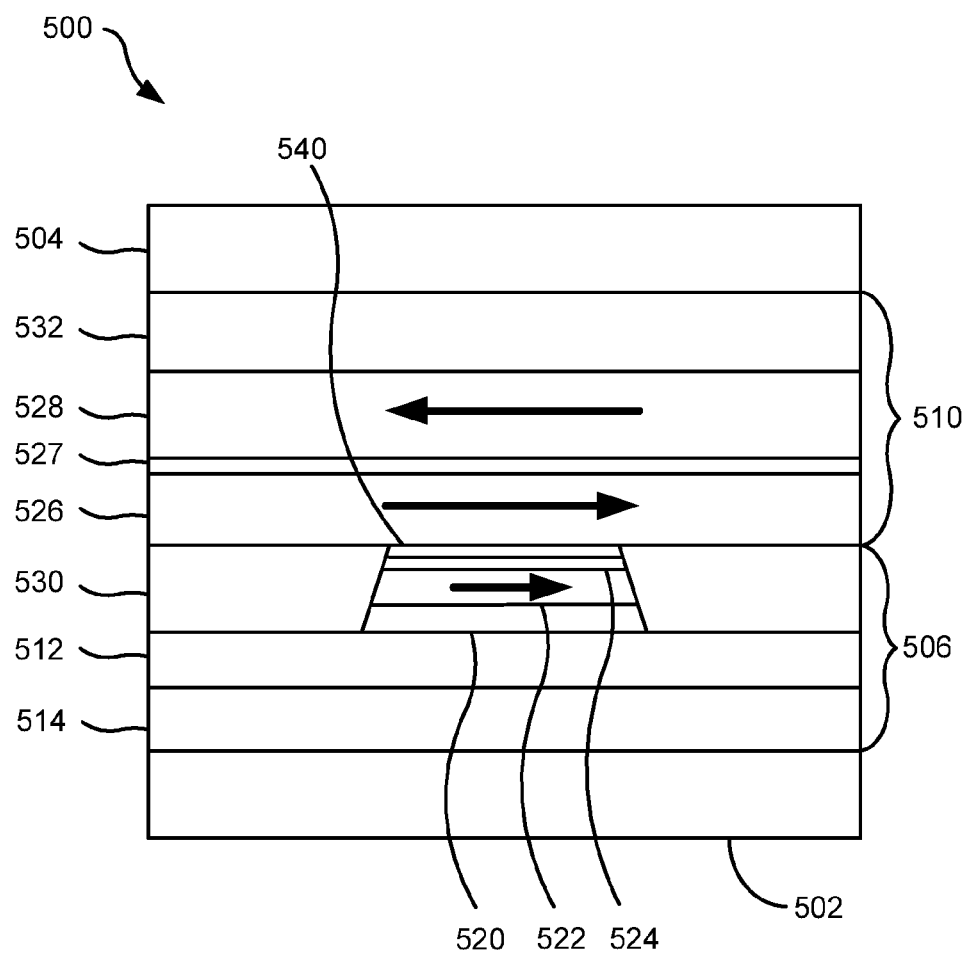
FIG. 5 illustrates a schematic view of an air-bearing surface of yet another alternative implementation of an MR sensor.
Figure 6:
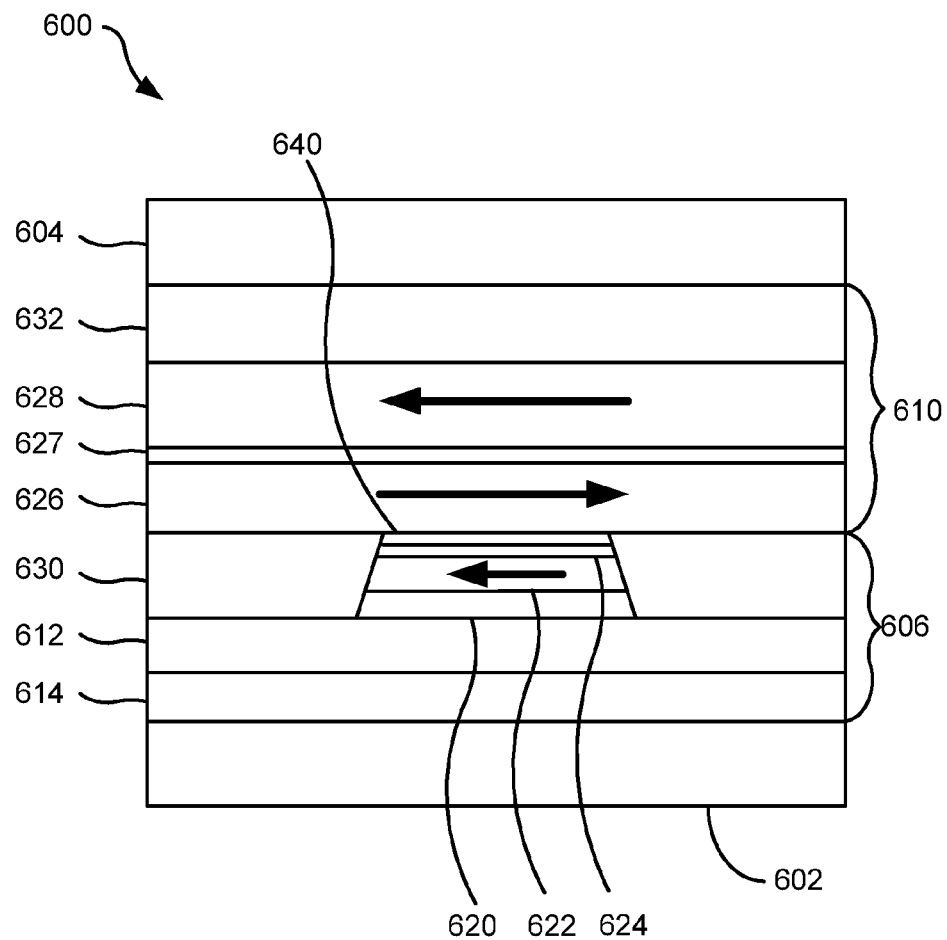
FIG. 6 illustrates a schematic view of an air-bearing surface of yet another alternative implementation of an MR sensor.

FIGS. 5 and 6 illustrate implementations of MR sensors having non-magnetic side shields. MR sensor 500 of FIG. 5 and its various elements are similar to MR sensor 300 and the various elements described above with respect to FIG. 3, and MR sensor 600 of FIG. 6 and its various elements are similar to MR sensor 400 and the various elements described above with respect to FIG. 4, other than the non-magnetic versus magnetic side shields. Similar components are designated by similar reference numbers with values in FIG. 5 increased by two hundred in relation to FIG. 3, and by two hundred in FIG. 6 in relation to FIG. 4.

MR sensor 500 includes a bottom bulk shield 502 and a top bulk shield 504 on opposite downtrack sides of a sensor stack 506. Sensor stack 506 includes an AFM layer 512 and a seed layer 514. Adjacent sensor stack 506 is a SAF top shield 510 that includes a RL 526 and a PL 528, with a spacer layer 527 therebetween, and an AFM layer 532; not shown in FIG. 5 is a spacer layer between top bulk shield 504 and AFM layer 532. Located on the two sides of sensor stack 506, in the cross-track or lateral direction, are side shields 530, in this implementation, non-magnetic side shields.

Sensor stack 506 includes a SAF layer 520 and a FL 522 which has a switchable magnetic orientation. FL 522 is ferromagnetically coupled with SAF top shield 510 through a RKKY coupling layer 524 and a magnetic capping layer 540 present between RKKY coupling layer 524 and SAF top shield 510. Magnetic capping layer 540 is directly ferromagnetically coupled with RL 526, which enables RKKY coupling between RL 526 and FL 522. Non-magnetic side shields 530 provide little or no biasing field to FL 522. However, the FL biasing field provided by the exchange coupling between RL 526 and FL 522 stabilizes FL 522.

Turning to FIG. 6, MR sensor 600 includes a bottom bulk shield 602 and a top bulk shield 604 on opposite downtrack sides of a sensor stack 606. Sensor stack 606 includes an AFM layer 612 and a seed layer 614. Adjacent sensor stack 606 is a SAF top shield 610 that includes a RL 626, a PL 628, a spacer layer 627, and an AFM layer 632; not shown in FIG. 6 is a spacer layer between top bulk shield 604 and AFM layer 632. Located on the two sides of sensor stack 606, in the cross-track or lateral direction, are side shields 630, in this implementation, non-magnetic side shields.

Sensor stack 606 includes a SAF layer 620 and FL 622 which has a switchable magnetic orientation. FL 622 is anti-ferromagnetically coupled with SAF top shield 610 through a RKKY coupling layer 624 and a magnetic capping layer 640. Magnetic capping layer is directly ferromagnetically coupled with RL 626, which enables RKKY coupling between RL 626 and FL 622. Non-magnetic side shields 630 provide no biasing field to FL 622. Similar to the implementation of FIG. 5, FL 622 is stabilized by the exchange coupling of FL 622 and RL 626.

Figure 7:
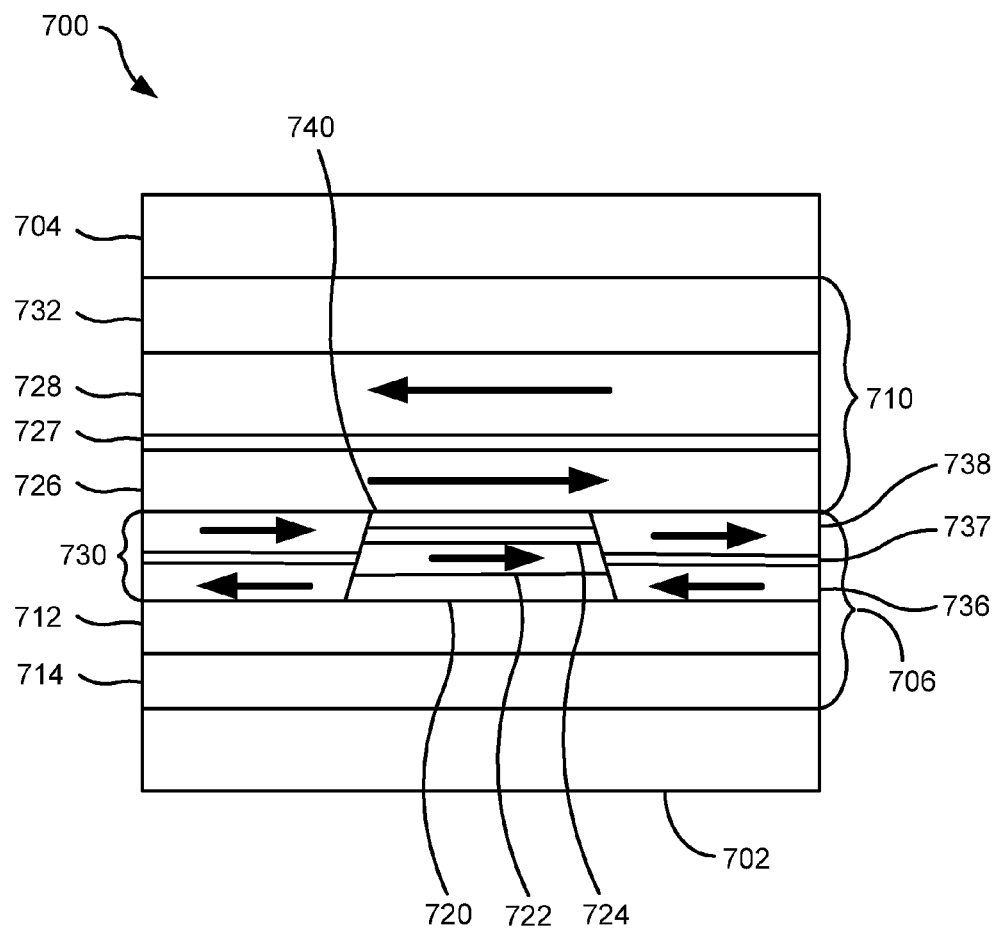
FIG. 7 illustrates a schematic view of an air-bearing surface of yet another alternative implementation of an MR sensor.
Figure 8:
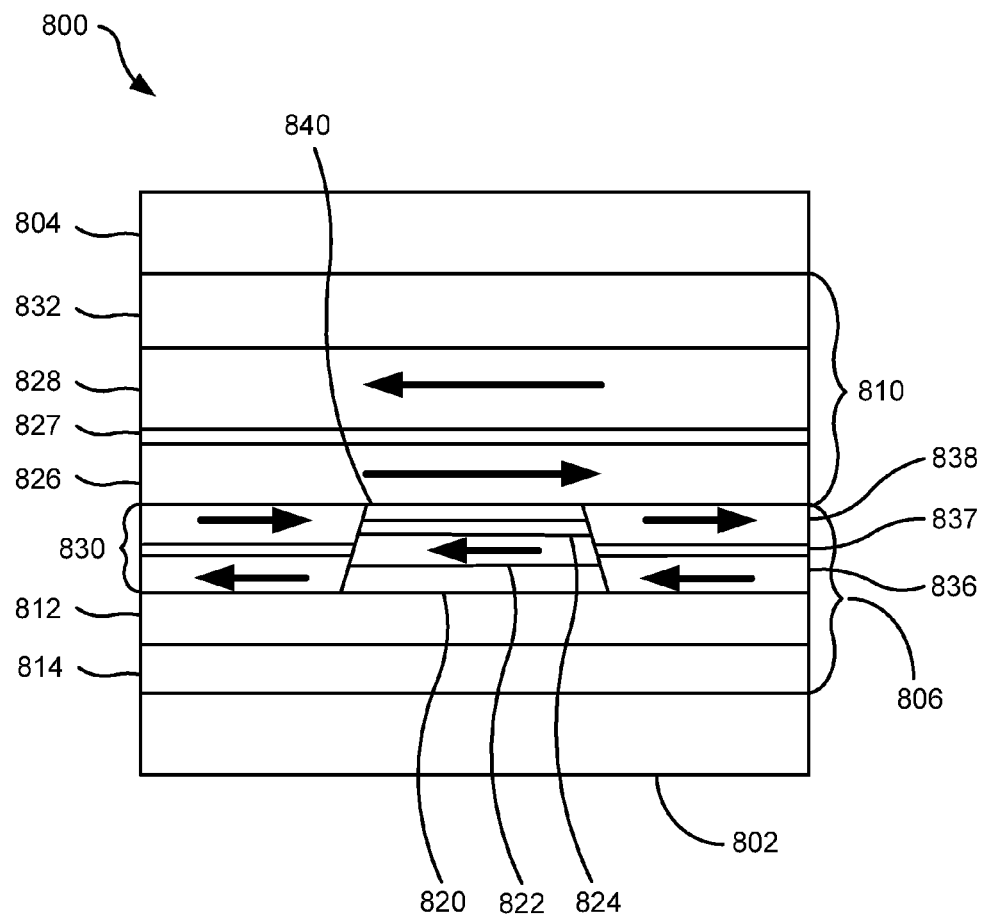
FIG. 8 illustrates a schematic view of an air-bearing surface of yet another alternative implementation of an MR sensor.

FIGS. 7 and 8 illustrate implementations of MR sensors having SAF side shields. MR sensor 700 of FIG. 7 and its various elements are similar to MR sensor 500 and the various elements described above with respect to FIG. 5, and MR sensor 800 of FIG. 8 and its various elements are similar to MR sensor 600 and the various elements described above with respect to FIG. 6, other than the SAF side shields. Similar components are designated by similar reference numbers with values in FIG. 7 increased by two hundred in relation to FIG. 5, and by two hundred in FIG. 8 in relation to FIG. 6.

MR sensor 700 includes a bottom bulk shield 702 and a top bulk shield 704 on opposite downtrack sides of a sensor stack 706. Sensor stack 706 includes an AFM layer 712 and a seed layer 714. Adjacent sensor stack 706 is a SAF top shield 710 that includes a RL 726 and a PL 728, with a spacer layer 727 therebetween, an AFM layer 732, and a spacer layer (not shown) between top bulk shield 704 and AFM layer 732. Located on the two sides of sensor stack 706, in the cross-track or lateral direction, are side shields 730, in this implementation, SAF side shields. These SAF side shields 730 include layers 736, 738 separated by spacer layer 737.

Sensor stack 706 includes a SAF layer 720 and FL 722 which has a switchable magnetic orientation. FL 722 is ferromagnetically coupled with SAF top shield 710 through a RKKY coupling layer 724 and a magnetic capping layer 740 between RKKY coupling layer 724 and SAF top shield 710. Magnetic capping layer 740 is directly ferromagnetically coupled with RL 726, which enables RKKY coupling between RL 726 and FL 722.

SAF side shields 730 act like a "shield" in the same manner as solid side shields do, but provide little or no biasing field on FL 722, depending on the magnetic flux balance of the SAF side shield layers. To provide biasing field on FL 722, RKKY exchange coupling is achieved between FL 722 and SAF top shield 710 through magnetic capping layer 740.

In FIG. 8, MR sensor 800 includes a bottom bulk shield 802 and a top bulk shield 804 on opposite downtrack sides of a sensor stack 806. Sensor stack 806 includes an AFM layer 812 in proximity to sensor stack 806, and a seed layer 814. Adjacent sensor stack 806 is a SAF top shield 810 that includes a RL 826, a PL 828, a spacer layer 827, an AFM layer 832 and a spacer layer (not shown) between top bulk shield 804 and AFM layer 832. Located on the two sides of sensor stack 806, in the cross-track or lateral direction, are side shields 830, in this implementation, SAF side shields. These SAF side shields 830 include layers 836, 838 separated by spacer layer 837.

Sensor stack 806 includes a SAF layer 820 and FL 822 which has a switchable magnetic orientation. FL 822 is anti-ferromagnetically coupled with SAF top shield 810 through a RKKY coupling layer 824 and a magnetic capping layer 840. Magnetic capping layer 840 is directly ferromagnetically coupled with RL 826, which enables RKKY coupling between RL 826 and FL 822.

Figure 9:
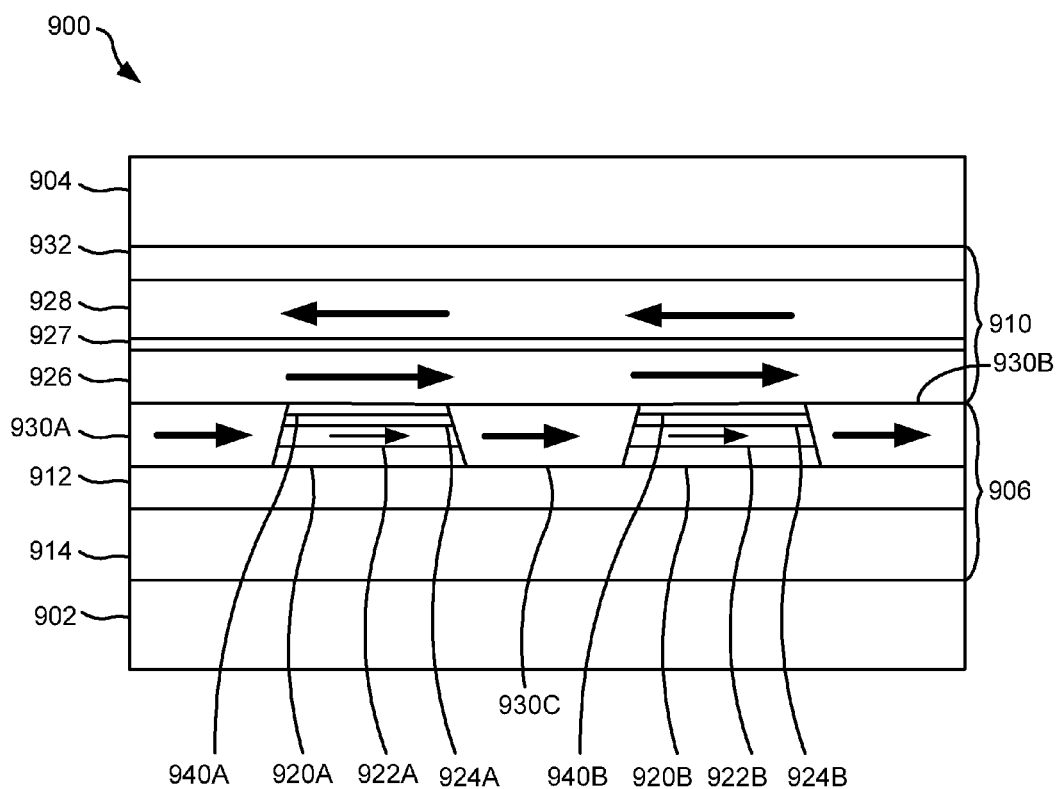
FIG. 9 illustrates a schematic view of an air-bearing surface of yet another alternative implementation of an MR sensor.

The sensors of this disclosure, having the magnetic capping layer, allow sensors having multiple sensor stacks (e.g., readers) in the same plane, which overcomes obstacles such as weak free layer biasing due to little or no side shields. In this design, free layer biasing for all these sensors can be provided by achieving exchange coupling between the FLs and SAF top shield through the magnetic cap and RKKY coupling layer. FIG. 9 illustrates an implementation having multiple sensor stacks.

Similar to the single sensor stack MR sensors described above, MR sensor 900 of FIG. 9 includes a bottom bulk shield 902 and a top bulk shield 904 on two opposite sides (along downtrack direction) of a stack 906 that has two read sensors. Proximate bottom bulk shield 902 is an AFM layer 912 and a seed layer 914. On the side of sensor stack 906 opposite bottom bulk shield 902 is a SAF top shield 910 that includes a RL 926, a PL 928, a spacer layer 927, an AFM layer 932 and a spacer layer (not shown) between top bulk shield 904 and AFM layer 932.

Sensor stack 906 has two read sensors; sensor stack 906 includes two SAF layers 920A, 920B, two FLs 922A, 922B, two RKKY coupling layers 924A, 924B, and two magnetic capping layers 940A, 940B between RKKY coupling layers 924A, 924B and SAF top shield 910.

Free layers 922A, 922B are ferromagnetically coupled with SAF top shield 910.

Located on the sides of sensor stack 906, in the cross-track or lateral direction, are side shields 930A, 930B, and located between the two read sensors is a third shield 930C. In this illustrated implementation, shields 930A, 930B, 930C are soft magnetic side shields, although in other implementations they could be hard magnetic, non-magnetic, or SAF shields.

Figure 10:
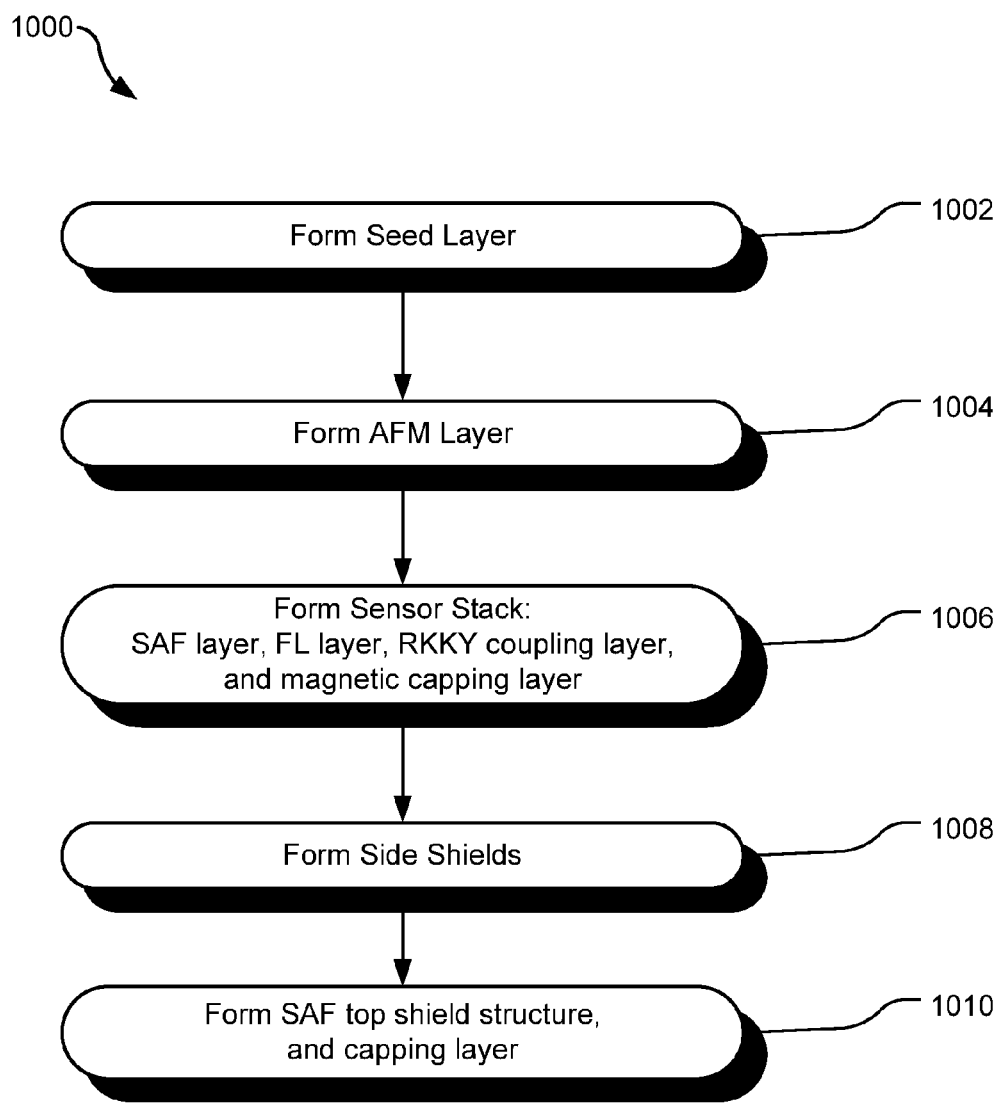
FIG. 10 is a flow diagram of an exemplary method for making an MR sensor.

FIG. 10 illustrates an example process 1000 for fabrication of an MR sensor disclosed herein. Specifically, the operations disclosed in FIG. 10 may be used for fabrication of an MR sensor having free layer—SAF top shield coupling facilitated by a magnetic capping layer.

An operation 1002 forms seed layers, such as layers of tantalum and ruthenium or other non-magnetic or magnetic metallic layers, and an operation 1004 forms an AFM layer, such as a layer of IrMn, on the seed layer. Subsequently, operation 1006 forms the other layers of the sensor stack on the bottom bulk shield and AFM layer. Specifically, operation 1006 forms the sensor stack SAF layer, a tunneling barrier layer, a free layer, a RKKY coupling layer, and a magnetic capping layer. Side shields are formed at operation 1008 on opposite sides of the sensor stack. The final operation of process 1000 includes operation 1010, which forms the SAF top shield, including a top SAF layer, a top AFM layer, and a capping layer. The resulting sensor includes a top SAF layer, a magnetic capping layer adjacent to the top SAF layer, an RKKY coupling layer adjacent to the magnetic capping layer opposite the top SAF layer, and a free layer adjacent to the RKKY coupling layer opposite the magnetic capping layer.

Thus, numerous embodiments of the SENSOR STACK STRUCTURE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method comprising:
    biasing a free layer in a reader stack by providing an exchange coupling between the free layer and a top synthetic antiferromagnetic (SAF) shield using a layer having RKKY coupling property, the RKKY coupling layer positioned in contact with and adjacent to the free layer and in contact with and adjacent to a magnetic capping layer comprising CoFeX, where X is a refractory metal, that is in contact with and adjacent to the top SAF shield, the top SAF shield comprising a ferromagnetic pinned layer, a ferromagnetic reference layer, and a spacer layer therebetween, the reader stack further having a sensor SAF layer comprising a ferromagnetic pinned layer, a ferromagnetic reference layer, and a spacer layer therebetween, the sensor SAF layer on a side of the free layer opposite the RKKY coupling layer, with only a barrier layer between the sensor SAF layer and the free layer.

2. The method of claim 1, wherein the refractory metal is a Group IVB or Group VB transition metal.

3. The method of claim 1, wherein the CoFeX comprises X in the range of 1 to 30 atomic percent.

4. The method of claim 1, wherein providing the exchange coupling between the free layer and the top synthetic antiferromagnetic (SAF) shield further comprises providing ferromagnetic coupling between the free layer and the top synthetic antiferromagnetic (SAF) shield.

5. The method of claim 1, wherein providing the exchange coupling between the free layer and the top synthetic antiferromagnetic (SAF) shield further comprises providing anti-ferromagnetic coupling between the free layer and the top synthetic antiferromagnetic (SAF) shield.

6. The method of claim 1, further comprising biasing the free layer using side shields located on two sides of the free layer along a cross-track direction.

7. The method of claim 6, wherein the biasing provided by the side shields and the biasing provided by the top SAF shield are in the same direction.

8. The method of claim 6, wherein the biasing provided by the side shields and the biasing provided by the top SAF shield are in opposite directions.

9. A reader stack comprising:
    a top synthetic antiferromagnetic (SAF) shield comprising a ferromagnetic pinned layer, a ferromagnetic reference layer, and a spacer layer therebetween;
    a magnetic capping layer in contact with and adjacent to the top SAF shield, the magnetic capping layer comprising CoFeX, where X is a refractory metal;
    an RKKY coupling layer in contact with and adjacent to the magnetic capping layer opposite the top SAF shield;
    a free layer in contact with and adjacent to the RKKY coupling layer opposite the magnetic capping layer;
    a barrier layer in contact with and adjacent to the free layer opposite the RKKY coupling layer; and
    a sensor SAF layer in contact with and adjacent to the barrier layer opposite the free layer, the sensor SAF layer comprising a ferromagnetic pinned layer, a ferromagnetic reference layer, and a spacer layer therebetween.

10. The reader stack of claim 9, further comprising first and second side shields located on two sides of the free layer along a cross-track direction.

11. The reader stack of claim 10 wherein the first and second side shields are SAF side shields.

12. The reader stack of claim 10 wherein the first and second side shields are non-magnetic side shields.

13. The reader stack of claim 10 wherein the first and second side shields are permanent magnet side shields.

14. The reader stack of claim 9 wherein the refractory metal is a Group IVB or Group VB transition metal.

15. A reader stack comprising:
    a top synthetic antiferromagnetic (SAF) shield comprising a ferromagnetic pinned layer, a ferromagnetic reference layer, and a spacer layer therebetween;
    a magnetic capping layer in contact with and adjacent to the top SAF shield, the magnetic capping layer comprising CoFeX, where X is a refractory metal;
    an RKKY coupling layer in contact with and adjacent to the magnetic capping layer opposite the top SAF shield;
    a free layer in contact with and adjacent to the RKKY coupling layer opposite the magnetic capping layer;
    a barrier layer in contact with and adjacent to the free layer opposite the RKKY coupling layer;
    a sensor SAF layer in contact with and adjacent to the barrier layer opposite the free layer, the sensor SAF layer comprising a ferromagnetic pinned layer, a ferromagnetic reference layer, and a spacer layer therebetween; and
    magnetic side shields present along a cross-track direction encompassing all of the sensor SAF layer, the barrier layer, the free layer, the RKKY coupling layer, and the magnetic capping layer.

16. The reader stack of claim 15, wherein the refractory metal is a Group IVB or Group VB transition metal.

17. The reader stack of claim 15, wherein the CoFeX comprises X in the range of 1 to 30 atomic percent.

* * * * *